United States Patent Office 3,511,605
Patented May 12, 1970

3,511,605
DEFLUORINATION OF PIGMENTARY SILICA
John E. Smith, Kendall Park, N.J., and James M. O'Neal, Monroe, La., assignors to Columbian Carbon Company, New York, N.Y., a corporation of Delaware
No Drawing. Filed Apr. 29, 1968, Ser. No. 725,167
Int. Cl. C01b 33/18
U.S. Cl. 23—182                          12 Claims

ABSTRACT OF THE DISCLOSURE

A reaction mixture comprising a fluorine-containing silica, steam and volatilized boric acid is maintained at a temperature of at least about 850° F. until a substantial portion of the fluorine has been released from the silica as a volatile reaction product.

BACKGROUND OF THE INVENTION

Field of the invention

This invention relates to silicon dioxide and more particularly to pigmentary silicas which are produced by high temperature vapor phase hydrolysis of silicon fluorides, e.g. silicon tetrafluoride.

Description of the prior art

Silicon tetrafluoride may be reacted with water vapor at high temperatures to produce silica and hydrogen fluoride in accordance with the following equation.

$$SiF_4 + 2H_2O \rightleftharpoons SiO_2 + 4HF$$

and the silica may then be separated from the HF and any other gaseous reaction products to provide an amorphous, pigmentary silica in the form of a fluffy, dry powder. The silica may be produced with a particle size within the range of 5 to 50 millimicrons and the surface area thereof may range upwards of 100 meters per gram.

Processes for producing pigmentary silicas by the vapor phase hydrolysis of silicon fluorides are adequately described in U.S. Pats. 2,535,056; 2,819,151 and 3,233,969. From U.S. Pat. 3,269,799 and Canadian Pat. 662,036 it can be determined that silicas produced in accordance with the aforementioned patented processes are distinctly acidic in nature because of residual fluorine contamination. This residual fluorine may exist as a silicon-fluorine compound on the surface of the silica particles, or as absorbed hydrogen fluoride, and the actual fluorine content of the silica may be as high as 3% by weight but more generally is 1 to 2% by weight. The fluorine content of the silica renders it undesirably hydrophobic so that it can be blended only with great difficulty into water and aqueous solutions. In addition, the fluorine-containing silica liberates acidic products, probably hydrogen fluoride, which is disadvantageous when neutrality is desired, as when the silica is used as a filler for silicone rubber. Furthermore, the fluorine containing silica suffers a gradual loss in surface area after collection from the production unit so that the silica becomes a less active and useful product. In any event, therefore, the fluorine should be substantially removed from the silica not too long after its formation in order to preserve its surface area and usfulness as a compounding ingredient.

In U.S. Pat. 3,269,799 it has been proposed that the detrimental effects of the fluorine be masked by treatment of the silica with ammonia vapor. However, no removal of the fluorine from the silica is actually involved in this treatment process and some silica-containing compounds cannot be successfully formulated unless the presence of fluorine is essentially excluded.

In Canadian Pat. 662,036 a process is described for the removal of fluorine from pigmentary silicas by treatment with steam at a temperature in excess of about 932° F. and more particularly at a temperature between about 932° F. and 1832° F. Thus, the fluorine content of the silica can be reduced to a neutralization number below about 15, but the process is costly and time consuming, i.e. according to the patent the exposure of the silica to steam, at temperature, must be maintained for at least 15–30 minutes.

SUMMARY OF THE INVENTION

It is therefore an object of this invention to provide an improved process for removing fluorine from fluorine-containing pigmentary silicas by treatment with steam.

It is another object of this invention to provide a high quality pigmentary silica that is substantially free of residual fluorine contamination.

Various other objects and advantages of the invention will appear from the following description and the novel features will be particularly pointed out hereinafter in connection with the appended claims.

In the present invention, silica, produced by the high temperature vapor phase hydrolysis of a silicon fluoride, is treated with steam to reduce its residual fluorine content, but the treatment is carried out in the presence of volatilized boric acid to provide a heretofore unrecognized synergistic effect whereby the fluorine removal process is greatly enhanced. The process for removing the fluorine can be carried out at a much faster rate and, accordingly, much less steam is required. Thus, a reaction mixture comprising a fluorine-containing silica, steam and volatilized boric acid is maintained at a temperature above about 850° F. until a substantial portion of the fluorine has been removed from the silica as a volatile reaction product, e.g. $BF_3$, $HF$, $HBF_3OH$, $HBF_4$, or the like. The volatile components of the reaction mixture, including the volatile fluorine reaction product and the steam, are then removed from the mixture to provide a defluorinated pigmentary silica which is hydrophilic and substantially less acidic than the untreated silica.

More specifically, the fluorine-containing silica should be treated with steam and the volatilized boric acid at a temperature in excess of 850° F. and more particularly within the range of 850° to about 1600° F. Most advantageously temperatures of 1200° F. to 1600° F. may be employed.

The volatilized boric acid in the reaction mixture may be produced by volatilizing either boric acid or boron oxide by contact with steam, and at the temperatures employed for removal of fluorine from the silica, the boric acid probably exists in the metaboric form, i.e. $HBO_2$. Boron oxide, $B_2O_3$, itself is a high boiling compound (B.P. 2250° C.) but is quite volatile in the presence of water vapor. The volatile molecule is $HBO_2$ at elevated temperatures. The equation for the reaction is $$\tfrac{1}{2}B_2O_3(\text{vitreous}) + \tfrac{1}{2}H_2O(\text{gas}) \rightarrow HBO_2(\text{gas}) \; \Delta H = -47.6$$

Boric acid itself is volatile in steam. The vapor pressure of boric acid at 1 atmosphere of steam at 180° C. is 15 mm. At higher temperatures the vapor pressure increases and $HBO_2$ becomes the predominate species in the vapor form.

Boric acid reacts rapidly with hydrogen fluoride to form the volatile compound $HBF_3OH$. A longer reaction time leads to the formation of fluorboric acid, $HBF_4$, which is also volatile.

Thus, in the present invention, a reaction mixture of fluorine—containing silica, steam and boric acid—either in the form of $H_3BO_3$ or $HBO_2$, is maintained at elevated temperatures for defluorination of the silica by formation of a volatile fluorine compound which is probably at least in part a volatile boron-fluorine compound such as $HBF_4$. Some of the fluorine may also be volatilized in the usual manner by steam as HF, $SiF_4$, or the like, but in any case the presence of boric acid provides a synergistic effect whereby the rate and degree of fluorine removal from the silica is greatly improved.

The amount of steam employed in the reaction mixture is variable, depending upon the rate, at which silica is to be defluorinated, i.e. the more water vapor, the faster the fluorine removal rate, but it will again be pointed out that the fluorine can be removed faster with less steam when boric acid is incorporated into the reaction mixture. Proportions within the range of about 0.5 gram to 2.0 grams of steam per gram of silica have been found satisfactory for removing fluorine from silica initially having a fluorine content within the range of 1 to 3% by weight.

The amount of boric acid employed in the reaction mixture is also variable but proportions within the range of about 0.05 gram to about 1.0 gram of boric acid (as $H_3BO_3$) per gram of silica have been employed to effect reduction of the fluorine content to below about 0.3% by weight, and as low as about .001% by weight, in 3 to 5 minutes time. Optimum results have been observed when the proportion is within the range of about 0.1 gram to about 0.5 gram of boric acid (as $H_3BO_3$) per gram of silica.

The reaction mixture may be formed within any batch or continuous treating apparatus which is suitable for contacting a finely divided powdered material with a treating gas. The silica may, for instance, be tumbled in the presence of steam and the volatilized boric acid within an externally heated rotating drum. On the other hand, a fluid bed of the silica may be established by passing steam through a vertical column of the sicila particles. Regardless of the treatment method, the boric acid can be incorporated into the reaction mixture either by mixing powdered boric acid or boron oxide directly with the silica prior to addition of steam, or the boron oxide or boric acid may be first volatilized by contact with steam and the resultant gaseous mixture can then be intimately contacted with the silica. In any case the volatilized materials should be removed from the silica after defluorination to prevent contamination of the silica. Thus, excess boric acid, steam, and the volatilized fluorine contaminant should be vented off or purged from the silica before it is cooled. It will be understood, of course, that sufficient steam and treatment time must be employed to effect volatilization and removal of substantially all of the boric acid or boron oxide when mixed as a powder with the silica prior to contact with the steam.

It will also become apparent from this disclosure that the rate at which the fluorine can be removed from the silica is considerably affected by the temperature at which the reaction mixture is maintained for removal of fluorine from the silica. As might be expected, the fluorine removal rate is accelerated by increasing the temperature. It should be pointed out, however, that reduction of the fluorine content of the silica can be reduced to a desired level at lower temperatures than is possible when employing steam alone as the treating agent.

DESCRIPTION OF THE PREFERRED EMBODIMENTS

The silicas which were employed in the following examples were produced by hydrolyzing silicon tetrafluoride with excess water vapor in a flame produced by burning natural gas with air to form an aerosol of finely divided pigmentary silica suspended in combustion gases, water vapor and HF. The silicas were collected in a big filter at temperatures of about 500° F. and were recovered as light, flocculent powders having a residual fluorine content of 1 to 2% by weight. All the silicas had a particle size within the range of 5–30 millimicrons and surface areas within the range of 100–200 meters per gram.

EXAMPLE

In the first experiment, a silica having a fluorine content of 1.73% by weight was treated in one gram lots with steam over a temperature range of 850° F. to 1600° F. Thereafter, samples of one gram of the silica mixed with one gram of powdered boric acid were treated over the same temperature range with steam. Treatments was carried out in a one inch inside diameter aluminum oxide tube heated externally by means of an electric furnace. The tube was vertically disposed and steam was passed in the saturated state into the bottom of the tube so that the silica was fluidized during the treatment. Treatment time in all cases was three minutes and the steam flow rate in each case was 3 grams of steam per gram of silica per minute. Volatilized components of the reaction mixture, including the volatilized fluorine compound, were vented from the top of the reaction tube during fluidization. The top of the tube was equipped with a filter to prevent entrainment loss of the silica. After heating, the defluorinated silicas were cooled and then tested for fluoride content by a colorimetric method. Results of this experiment are presented in Table I:

TABLE I

| Temp., ° F. | Percent F., steam alone | Percent F., steam and $H_3BO_3$ |
|---|---|---|
| 850 | 1.610 | 0.849 |
| 1,000 | 1.270 | 0.200 |
| 1,200 | 0.498 | 0.041 |
| 1,400 | 0.036 | 0.016 |
| 1,600 | 0.003 | 0.001 |

Thus, it can be seen from Table I that the process of the present invention effected far more thorough removal of the fluorine from the silica over the entire temperature range, but more particularly at the lower temperatures, which are, of course, more desirable from the standpoint of practicality and economics.

EXAMPLE II

In another experiment the same treating apparatus was employed to treat one gram samples of silica with steam at 1400° F. over varying time periods. Samples of one gram of the silica mixed with one gram of powdered boric acid were also treated at the same time periods with steam. The time periods ranged from 15 seconds to 180 seconds. The untreated pigmentary silica had a fluorine content of 1.56% by weight. The results of this experiment are presented in Table II.

TABLE II

| Time (sec.) | Percent ° F., steam alone | Percent F., steam and $H_3BO_3$ |
|---|---|---|
| 15 | 0.604 | 0.078 |
| 30 | 0.421 | 0.043 |
| 60 | 0.166 | 0.013 |
| 90 | 0.072 | 0.009 |
| 120 | 0.046 | 0.008 |
| 150 | 0.044 | 0.006 |
| 180 | 0.027 | 0.003 |

As can be seen from Table II, the process of the invention provided a reduction in the fluorine content of the silica to below about 0.08% at about 5 or 6 times the rate as when steam alone was employed; and at equivalent treatment times, the process of the invention reduced the fluorine content of the silica to a level nearly one whole order of magnitude lower than was accomplished by means of steam alone.

EXAMPLE III

Another experiment was run to determine the effective amount of boric acid which should be employed when defluorinating the silica with steam. Varying amounts of boric acid from zero to 1.0 gram were mixed with one gram samples of silica which were then treated as in the previous experiment at 1400° F., but in each case the treatment time was one minute. The untreated silica had a fluorine content of 1.67% by weight. Results are shown in Table III.

TABLE III

| Ratio by weight $H_3BO_3/SiO_2$: | Percent F. remaining after treatment with steam |
|---|---|
| 0.00 | 0.1570 |
| 0.01 | 0.1570 |
| 0.05 | 0.0628 |
| 0.10 | 0.0630 |
| 0.25 | 0.0271 |
| 0.50 | 0.0270 |
| 1.00 | 0.0239 |

This experiment shows that at the particular conditions involved, a proportion of boric acid in excess of 0.01 gram per gram of silica was required to effect a greater degree of fluorine removal from the silica than could be achieved with steam alone. Optimum results were obtained when the proportion of boric acid ($H_3BO_3$) to silica was within the range of about 0.05 gram to 0.50 gram per gram of silica.

EXAMPLE IV

In this experiment, 1.5 grams of powdered boron oxide, $B_2O_3$, was mixed with 3.0 grams of the untreated silica of Ex. III and treated for 5 minutes in the fluidized bed with saturated steam at the rate of 4–5 grams of steam per minute. The bed was heated to a temperature of 1400° F. during the fluidization. For comparison purposes, samples of 4.5 grams of silica and 3 grams of silica mixed with 1.5 grams of boric acid ($H_3BO_3$) were treated with steam at the same rate under the same time and temperature conditions. Upon analysis, the silica treated with steam in the absence of a boron compound showed a fluorine content of 0.328% by weight, the sample mixed with boric acid showed a fluorine content of 0.141% by weight and the sample mixed with boron oxide showed a fluorine content of 0.091% by weight. Thus, boron oxide functioned effectively as a source for the boric acid treating agent of the present invention.

All of the samples from Examples I–IV which were treated in accordance with the invention were hydrophilic in nature and sufficiently neutral for use as a filler in silicone rubber. Accordingly, it has been found that the silica should be defluorinated until its fluorine content is reduced to below about 0.3% by weight and more advantageously to at least about 0.03% by weight. This level of fluorine reduction is readily accomplished by means of the present invention.

It will be understood that various changes in details, materials and steps, which have been herein described to explain the nature of the invention, may be made by those skilled in the art within the principle and scope of the invention as expressed in the appended claims.

We claim:

1. A process for removing fluorine from a pigmentary silica which comprises maintaining a reaction mixture comprising a fluorine-containing pigmentary silica, steam and volatilized boric acid at a temperature of at least about 850° F. until a substantial portion of the fluorine has been released from the silica as a volatile reaction product.

2. The process of claim 1 in which the volatilized boric acid is produced by volatilizing $H_3BO_3$ in the presence of steam.

3. The process of claim 1 in which the volatilized boric acid is produced by volatilizing $B_2O_3$ in the presence of steam.

4. The process of claim 1 in which the proportion of boric acid ($H_3BO_3$) to silica in the reaction mixture is within the range of about 0.05 gram to about 1.0 gram of boric acid per gram of silica.

5. The process of claim 1 in which the temperature of the reaction mixture is maintained within the range of about 850° F. to about 1600° F.

6. The process of claim 1 in which the temperature of the reaction mixture is maintained within the range of about 1200° F. to about 1600° F.

7. The process of claim 1 in which the reaction mixture is maintained at the specified temperature until the fluorine content of the silica has been reduced to below about 0.3% by weight.

8. The process of claim 1 in which the reaction mixture is maintained at the specified temperature until the fluorine content of the silica has been reduced to below about 0.03% by weight.

9. The process of claim 1 in which the proportion of boric acid to silica in the reaction mixture is within the range of about 0.5 gram to about 0.50 gram of boric acid per gram of silica.

10. The process of claim 1 in which the amount of steam employed in the reaction mixture is within the range of about 0.5 gram to 2.0 gram of steam per gram of silica.

11. The process of claim 1 in which a compound selected from the group consisting of boron oxide and boric acid is mixed as a powder with the silica of the reaction mixture.

12. The process of claim 1 in which the silica of the recation mixture is fluidized by passing the steam through a bed of the silica.

References Cited

UNITED STATES PATENTS

| 2,830,026 | 4/1958 | Shapiro | 23—182 XR |
| 3,053,627 | 9/1962 | Flemmert | 23—182 |

EDWARD STERN, Primary Examiner